United States Patent [19]

Kalil

[11] 3,899,438

[45] Aug. 12, 1975

[54] SIMULTANEOUS REACTION AND DISPERSION OF 4,4-METHYLENE DIANILINE-SALT MIXTURES TO FORM COMPLEXES THEREOF

[75] Inventor: James Kalil, Wilmington, Del.

[73] Assignee: E. I. du Pont de Nemours & Co., Wilmington, Del.

[22] Filed: Oct. 17, 1973

[21] Appl. No.: 407,266

[52] U.S. Cl............... 252/182; 252/49.7; 260/2 EP; 260/2.5 AM; 260/46.5 G; 260/77.5 R; 260/77.5 CA; 260/77.5 AM; 260/79.3 M; 260/85.3 C; 260/92.15; 260/92.3; 260/94.9 GA; 260/75 NH
[51] Int. Cl. ... C08g 22/16; C08b 27/72; C09k 3/00
[58] Field of Search............... 260/75 NH, 77.5 AM; 252/49.7, 182

[56] References Cited
UNITED STATES PATENTS

| | | | |
|---|---|---|---|
| 3,459,683 | 8/1969 | McCoy et al. | 252/49.7 |
| 3,511,814 | 5/1970 | Ogura et al. | 260/75 NH |
| 3,576,875 | 4/1971 | Rohe | 260/570 |
| 3,629,168 | 12/1971 | Ryan | 260/77.5 AM |
| 3,755,261 | 8/1973 | Van Gulick | 260/77.5 AM |

*Primary Examiner*—H. S. Cockeram

[57] ABSTRACT

A method for preparing small particles of a complex of 4,4'-methylene dianiline and selected alkali metal salts including sodium chloride in an inert liquid which comprises agitating a mixture of tris-(4,4'-methylene dianiline), alkali metal salt, an inert liquid vehicle and water; the amount of water being at least 0.5 part per 100 parts of salt and not more than that quantity which would provide a saturated solution throughout at least 50% of the complex-forming reaction.

12 Claims, No Drawings

SIMULTANEOUS REACTION AND DISPERSION OF 4,4-METHYLENE DIANILINE-SALT MIXTURES TO FORM COMPLEXES THEREOF

BACKGROUND OF THE INVENTION

The curing of amine-curable polymers, such as isocyanato-terminated polyurethane prepolymers, epoxy resins and millable halogen-containing hydrocarbon polymers, is well known. In the past, curing has generally involved mixing the amine curing agent with the curable polymer by means suitable for the materials involved and forming the mixture into a useful form, followed by a heating step to complete the curing reaction. A problem which is encountered in this prior art procedure has been the premature reaction of the curing agent with the curable polymer during the mixing step and during the interval following milling until the forming operation is completed. The problem posed by premature reaction or curing varies widely in degree for different amine curing agent/polymer systems, but must be taken into consideration in most instances. In more reactive systems, such as those employing isocyanato-terminated polyurethane prepolymers the problems resulting from prereaction have previously necessitated the use of special low residence time mixers and selected diamines of reduced reactivity as curing agents, thereby markedly reducing the properties of the vulcanizates. Recently, a curing composition has been discovered which alleviates these problems. The complex which is described in U.S. Pat. No. 3,755,261 consists essentially of 4,4'-methylene dianiline (MDA) and an alkali metal salt such as sodium chloride; it has further been found that the complex may be transported in an inert liquid vehicle such as di(2-ethylhexyl)phthalate. Related applications include Caruso-Verbanc Ser. No. 387,791, filed Aug. 13, 1973 and Kogon Ser. No. 402,490, filed Oct. 1, 1973.

A difficulty which has been encountered with the use of the complex is that it tends to form as large diameter particles; it is most desirable, however, to have the complex in the form of small diameter particles, e.g. those having a diameter of 10 microns or less and most preferably 5 microns or less, which are far more reactive. Forming such particles has required a costly and time consuming grinding operation.

Thus an effective method for forming the particles of complex which will readily produce such smaller particles e.g. 10 microns or less is needed.

SUMMARY OF THE INVENTION

According to this invention a method has unexpectedly been found for conveniently forming particles of the MDA-alkali metal salt, e.g. sodium chloride, complex in which at least about 95% of the particles are below 10 microns in diameter and preferably below 5 microns. This is effected by an in situ preparation of the complex in the presence of an inert carrier liquid.

The complex is prepared in situ by adding MDA and the alkali metal salt, e.g. sodium chloride, separately into a reactor which provides suitable agitation such as a ball mill. In addition an inert liquid vehicle may also be added to the mixture.

It is essential to the instant invention that water be present during the reaction between the 4,4'-methylene dianiline and the alkali metal salt, e.g. sodium chloride. The reaction directly results in the formation of particles of complex 95% of which have a diameter of 10 microns or less, preferably 95% have a diameter of 5 microns or less.

At least 0.5 part of water is added per 100 parts of salt; the maximum amount of water to be added is an amount such that a saturated salt solution exists throughout at least about 50% of the complex-forming reaction. A standard material balance may be utilized to determine when a saturated salt solution exists throughout at least about 50% of the complex-forming reaction.

It is much preferred for the reaction to take place in the presence of an inert carrier liquid. By inert it is meant that the liquid will not promote the rapid decomposition of the complex which is to be formed. It must also be unreactive toward the polymer or prepolymer which is ultimately to be cured and the vehicle must be free flowing or mobile to facilitate commingling of the complex with the polymer or prepolymer, e.g. di(2-ethylhexyl)phthalate.

For every part by weight of sodium chloride which is present about 9 to 10 parts of MDA are present and about 2 to 10 parts of the inert carrier. The complex between the MDA and alkali metal salt, e.g. NaCl forms in a ratio of 3 moles of MDA to 1 mole of salt.

DETAILED DESCRIPTION

In more detail, the instant invention relates to a process for the formation of small particles of a complex of 4,4'-methylene dianiline and an alkali metal salt, e.g. sodium chloride; it is much preferred that these particles be formed within an inert liquid carrier such as di(2-ethylhexyl)phthalate.

Initially, the MDA and salt are added separately to an agitating device such as a ball mill. Specifically, the composition to be formed as a curing agent for amine-curable polymers is the reaction product of MDA with the following salts in the ratio of 3 moles of MDA to 1 mole of salt: sodium chloride, sodium bromide, sodium iodide, lithium chloride, lithium bromide, lithium iodide, and sodium cyanide. The MDA and the salt are added in the following ratio: 1 part of salt by weight per each 9 to 10 parts of MDA. Water is also added to the reaction mixture; the presence of water is essential for the formation of particles of the complex of MDA and the alkali metal salt. The particles have the desired diameter, e.g. at least 95% less than 10 microns in diameter, preferably 95% having a maximum diameter of 5 microns and most preferably about 99% having a maximum diameter of 5 microns.

At least 0.5 part of water must be added to every 100 parts of salt which is present; regarding the maximum quantity of water which may be utilized it should be sufficient so that a saturated salt solution is provided during 50% of the complex-forming reaction, preferably during 80% of the complex-forming reaction, and most preferably during 90% of the complex-forming reaction. While water is required for complex formation to proceed, the quantity employed must be limited as indicated in order to produce particles of complex in the desired size range. For example, if saturated brine is employed in the absence of any undissolved sodium chloride, the particle size of the complex produced ranges from 10–75 microns. It is theorized that the reaction of salt and MDA takes place at the interface of the salt-water solution and a solution of MDA. The complex precipitates at the interface. Because the interface is changed rapidly by the agitation in the system, the particles have only a limited chance to grow and hence are extremely fine. The high concentration of salt employed to produce fine particles is believed to increase the number of crystalline nucleii available at the interface. There is, however, no intent to be bound by any particular mechanism for the formation of the small particles of the complex.

It is also much preferred to have an inert liquid carrier or vehicle present in the reaction zone. In this way the particles are dispersed within the inert vehicle liquid as they are formed and a dispersion which can be used conveniently as a curing agent is obtained directly. About 2 to 35 parts of the inert liquid should be present for each part of salt.

The inert vehicle liquid for carrying the dispersion must have the following characteristics. Initially, it must be inert so that it does not promote the decomposition of the complex. Next it must be unreactive toward the polymer that is to be cured ultimately. The vehicle liquid should contain no functional groups which would be reactive with the amine groups of the complex or the amine-reactive groups present in the amine-curable polymer. In the case of polyurethane applications the vehicle liquid should contain no active hydrogens which would react with the available isocyanate groups of the polymer or prepolymer.

The liquid must also be readily miscible with the prepolymer or polymer which is to be cured so that the liquid and polymer may be readily comingled. This represents a major advantage of the use of the dispersion since it serves to facilitate dispersion of the curing agent uniformly throughout the prepolymer or polymer without requiring the expenditure of much energy. It has been found that when the finely divided curing agent is added alone to the polymer or prepolymer that relatively intensive mixing is required to adequately disperse the curing agent. This is not just inconvenient buy may result in some premature curing because of the heat generated from the mixing operation. It is believed that this difference in mixing ease is due to the presence of agglomerates of small particles in the dry curing agent which are not present in the dispersions resulting from the process of this invention. The importance of the mutual compatibility of the liquid phase of the curing agent dispersion and the polymer or prepolymer being cured is illustrated by the following example. Nujol oil — a saturated light hydrocarbon petroleum oil — readily forms a stable dispersion with the complex; however, the resultant mixture is incompatible with polyether or polyester polyurethanes and the Nujol dispersions are ineffective for curing such prepolymers.

Generally, the vehicle liquid will possess sufficiently low volatility so as not to vaporize from the cured polymer after curing or during end-use applications. The liquid vehicle may, however, be volatile as long as it is compatible with the polymer in applications where the loss of a solvent-like material could take place without difficulty such as in a surface coating. If the liquid vehicle is sufficiently low boiling, such as methylene chloride, it can serve as an expanding agent during the curing operation to yield cellular products.

Other properties of the vehicle liquid must take into consideration the application in which the composition is to be used; i.e., coatings may require a non-discoloring vehicle liquid, etc.

Typical examples of such vehicle liquids include di(2-ethylhexyl)phthalate, tetramethylene glycol bis(2-ethylhexanoate) and Dutrex 739 oil, an aromatic process oil which is a product of the Shell Oil Company and comprises 0% asphaltenes, 18% polar compounds, 76% aromatics and 6% saturated petroleum derivatives determined by the Clay-Gel method of ASTM D2007. Additional useful liquids include other esters of phthalic acid and related isophthalate and trimellitate esters, aromatic and naphthenic hydrocarbon processing oils or extenders, halogenated biphenyls and liquid aromatic sulfonamides. Paraffinic hydrocarbon oils can also be used but in general they have limited compatibility with most of the well-known amine-curable polymers and therefore are of value only on rare occasion.

Liquids which would generally not be acceptable as vehicles include materials such as carboxylic acids and acyl halides which have a tendency to break down the amine-salt complex. As previously indicated, paraffinic oils are not suitable for many amine-curable polymers because of their limited compatibility.

The reaction between the MDA and the alkali salt, e.g. sodium chloride, proceeds readily at ambient conditions; if desired elevated temperature may be utilized. Higher temperatures increase the solubilities of the MDA in the inert carrier liquid and the salt in the water. Higher temperatures also lower the viscosity of the reaction medium and can be useful on occasion. However, ambient temperatures or slightly elevated temperatures below 80°C. are preferred. In general ambient pressure is utilized. Pressure has no substantial effect on the progress of the reaction. The reaction requires agitation which is sufficient to keep changing the interface between the salt-water solution and MDA-carrier solution. Suitable mixing devices include high shear homogenizers and blenders. It is also convenient to carry out the reaction in a ball mill reactor. Briefly, this is a cylindrical metallic or ceramic mill which employs metal or ceramic balls or stones within the revolving cylinder. The balls or stones serve to commingle the reaction mass and may also reduce the size of any large particles should any be present.

As the reaction continues the viscosity in the reaction zone increases correspondingly. It is hypothesized, although there is not intent to be bound by any mechanism, that the formation of the small particles of the complex results in an increase in viscosity.

The reaction proceeds over a period of from about 5 minutes to 200 hours until it is completed. The time required depends mainly on the type of equipment employed and proportions of materials used.

Completion of the reaction is indicated by the absence of solids in the melting point range of MDA (80°–90°C). The melting point of the MDA-salt complex is 135°C or higher.

The viscosity of the reaction medium and the resulting product can be reduced by the addition of an oil soluble dispersing agent. The use of a dispersing agent reduces the level of agitation required. The dispersing agent may be added initially along with the other ingredients or may be added during the course of the reaction. A typical dispersing agent which has proven to be effective is lecithin. Other oil-soluble surface active agents can be used such as phosphated mono- and diglycerides, cetyl pyridinium bromide, cetyl trimethyl ammonium bromide and polyoxypropylated quaternary ammonium halides. The dispersing agent should be added in the amount of about 0.1 to 5.0%, preferably 0.2 to 2.0% of the total reaction mass.

After the agitation and reaction are completed a dispersion containing up to about 75 weight percent of complex is obtained. Generally, it is more convenient to prepare and use dispersions containing about 40-60 weight percent of complex. Obviously, the dispersions can be prepared at or diluted to lower concentrations of the complex if desired. It is, however, essential that the complex particles be of such a size that at least about 95% have a diameter of no more than about 10 microns, preferably at least about 95% have a diameter of no more than about 5 microns and most preferably at least about 99% have a diameter of no more than about 5 microns.

The dispersion after it is formed may then be utilized for the curing of amine-curable prepolymers or polymers; typical of these polymers are the urethanes. Other prepolymers or polymers which may be cured with the complex of the instant invention include the following:

1. Epoxy resins such as those disclosed in the "Encyclopedia of Polymer Science and Technology" Interscience Publishers, New York (1967), Volume 6, pps. 212–221. The curing of certain epoxy resins with methylene dianiline is described in U.S. Pat. No. 2,773,048 to Formo et al. In the present process, the amine complex can be used in equivalent amounts to those suggested for the free diamine by U.S. Pat. No. 2,773,048 and the "Encyclopedia of Polymer Science and Technology", Volume 6, pps. 226–230.

2. Halogen-containing hydrocarbon polymers such as chloroprene polymers, chlorinated butyl rubber and chlorinated polyethylene and polypropylene. Chloroprene polymers are described in the "Encyclopedia of Polymer Science and Technology", Volume 3, (1965), pps. 705–728. Chlorinated butyl rubber and its curing by diamines is described in British Pat. No. 815,939. In curing halogen-containing polymers of these types with the complex used in the instant process, it is customary to include a metal oxide acid acceptor such as zinc oxide.

The curing or cross-linking of hydrofluorinated polymers with polyamines is disclosed in U.S. Pat. No. 2,979,490 to West.

3. Chlorosulfonated polymers such as those described in U.S Pat. No. 2,723,257 to McAlevy, which patent relates to the curing of such polymers with aromatic diamines including methylene dianiline.

4. Polymers containing acid halide groups such as

and haloformate groups, such as

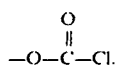

The curing of these polymers with methylene dianiline is analogous to the curing of chlorosulfonated polymers.

5. Polymers containing anhydride groups which on reaction with diamines yield amide-acid linkages.

6. Organopolysiloxanes such as described in U.S. Pat. No. 2,938,010 to Bluestein, which patent relates to the use of diamines as curing agents for organopolysiloxanes.

All patents and articles referred to above are herein incorporated by reference.

The prepolymers and/or polymers are admixed with the dispersion described above and then cured by standard techniques.

Since the urethanes (that is, prepolymers and polymers containing isocyanato groups) are typical polymers which may be cured by the process of the instant invention a more detailed description of the curing procedure with the urethanes will be included; it should be emphasized that there is no intention to limit the invention, however, to the urethanes but rather all amine-curable polymers and prepolymers of which the above-mentioned are representative are intended to be within the scope of the instant invention.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to in excess of about 10,000. Examples of such polymers are described in U.S. Pat. Nos. 2,620,516, 2,777,831, 2,843,568, 2,866,774, 2,900,368, 2,929,800, 2,948,691, 2,948,707, 3,114,735; herein incorporated by reference.

Prior to the curing operation itself, the dispersion and the amine-curable polymer or prepolymer must be comingled. In the case of liquid polymers and prepolymers, such as isocyanate-terminated urethane prepolymers or liquid epoxy resins, the dispersion can be mixed with the curable polymer by means ranging from hand mixing with a spatula up to continuous high speed mixers of the type normally used for mixing diamines with polyurethane prepolymers. Comingling can also be effected in static mixing devices, e.g. Kenics Mixers (Kenics Corp.) alone or in combination with mechanical mixers. In order to insure vulcanizates free of bubbles the mixture of dispersion and prepolymer should be degassed by agitating under vacuum before use. Alternatively, the dispersion and prepolymer may be degassed separately prior to mixing under conditions which do not permit contact with gases such as air. In the case of a solid type polymer or gum which is to be cured, the dispersion may be commingled on a rubber mill or in an internal mixer (a Banbury Mixer). Once the gum has been banded on the mill or broken down in the internal mixer, the dispersion can be added directly and milling or mixing continued until a uniform mixture has been prepared.

In mixing the dispersion of complex with either fluid prepolymers or millable gums the temperature must be kept below the decomposition point of the complex in order to avoid the possibility of premature curing. In the present process the decomposition point of the complex is a function of the particular complex being used, the instant carrier and the polymer in which the complex is dispersed. For isocyanato-terminated urethane prepolymers and the sodium chloride complex of methylene dianiline, mixing should be performed below 80°C, and preferably around 5°–60°C.

The temperature to be utilized during the curing of urethanes will be about 80°–180°C. Temperature is not particularly critical but it must be above the temperature at which the complex dissociates in the system being cured; this temperature will also vary with each particular complex. The complex between sodium chloride and 4,4'-methylenedianiline begins to dissociate at about 90°C. in a urethane system.

Full curing will ordinarily take about 1 minute to 24 hours depending on the temperature for urethanes when utilizing the MDA/sodium chloride complex. Preferred curing conditions range from ½ – 12 hours at temperatures ranging from about 100°–150°C. At these preferred curing temperatures sufficient cure to permit demolding occurs within about 5 seconds to 5 minutes because of the high reactivity of the MDA once it has been liberated from the complex. In the present process, the high reactivity of MDA becomes advantageous, whereas this reactivity prevented any practical use of MDA by prior art curing procedures in which gellation occurred before uniform mixing of free MDA and prepolymer could be accomplished. The present process provides unlimited time for mixing, prolonged storage of the mixture and ample time for filling the most complex of molds coupled with almost instant gelation permitting demolding as soon as the mixture is heated.

Curing times vary with other polymer systems as previously indicated. In general, cure times recommended for prior art curing processes using free diamines are satisfactory for the present process because recommended cure temperatures are generally in excess of the decomposition point of the complex. For epoxy resins, cure times of 15 seconds to 15 minutes at temperatures of 120°C. to 190°C. are suggested. For halogen-containing hydrocarbon polymers times of about 1 minute to 2 hours at temperatures of about 100° to 220°C. are suggested. Similar conditions can be used for chlorosulfonated polyethylene.

It is believed that the reactions which take place in the present curing process are identical to those which occur when free MDA is used as a curing agent by prior art curing procedures.

The curing equipment and curing procedures used in the present process are conventional.

The following examples are illustrative of the present invention and therefore are not intended in any way as a limitation on the scope thereof. Parts and percents are by weight unless otherwise indicated.

EXAMPLES

EXAMPLE 1

Methylene dianiline, sodium chloride, dibutyl phthalate and water in the proportions shown below are charged into a No. 19 glass jar (~½ pint) about half filled with ceramic balls (~¾ inch). The charged glass jar is placed on a roller for the length of time shown below:

| | |
|---|---|
| Dibutyl Phthalate | 100.0 parts |
| NaCl | 4.5 |
| Methylene Dianiline | 45.5 |
| Water | 1.0 |
| Ball Milling Time | 22.5 hours |

Examination of the particles by electron microphotograph reveals that 95% of the particles are less than 5μ, with an estimated average particle size in the range of 2–3 microns.

The crystals are isolated from the dispersion by diluting it with hexane, filtering, washing with hexane and drying. The crystals isolated have a melting point of 153°–163°C.

EXAMPLE 2

This Example illustrates the critical role of water. The same ball milling procedure is used as described in Example 1, except the water level is varied. The proportions are shown below.

| | No. 1 | No. 2 | No. 3 |
|---|---|---|---|
| Dibutyl Phthalate | 100 pts. | 100 pts. | 100 pts. |
| NaCl | 4.5 | 4.5 | 4.5 |
| Methylene Dianiline | 45.5 | 45.5 | 45.5 |
| Water | 0 | 0.05 | 0.5 |

After 29 days, the melting point of the crystals taken from the ball mill containing no water (No. 1) have a melting point of 89°C. (The methylene dianiline used has a melting point of 88°–90°C). The sample containing 0.05 parts of water has a melting point of 157°–162°C. after about 7 days. The sample containing 0.5 parts of water has a melting point of 152°–162°C. after about 7.5 hours. The complex is isolated for melting points by the procedure used in Example 1. Microscopic examination indicated that over 90% of the particles had an average particle size of less than 5 microns.

EXAMPLE 3

This Example illustrates the use of another type of inert ingredient - essential a hydrocarbon base rather than an aromatic ester (dibutyl or dioctyl phthalate). The procedure and equipment used are the same as Example 1. The materials are shown below:

| | |
|---|---|
| Mineral Oil | 100.0 parts |
| Methylene Dianiline | 45.5 |
| Sodium Chloride | 4.5 |
| Water | 0.5 |

After 11 days of ball milling, the melting point of the crystals is 155°–165°C. The crystals are isolated by the procedure described in Example 1. Microscopic examination indicated that over 90% of the particles had an average particle size of less than 5 microns.

EXAMPLE 4

This control Example illustrates the use of higher water levels outside the limits of the present invention. The procedure and equipment used are the same as Example 1. The materials used are shown below:

| | |
|---|---|
| Dioctyl Phthalate | 100.0 parts |
| Methylene Dianiline | 45.5 |
| Sodium Chloride | 4.5 |
| Water | 15.2 |

After eleven days, the melting point of the crystals is 145°–165°C. The particle size is considerably higher than in previous examples; i.e. 10–75μ. The quantities of salt and water employed in this Example are such that essentially none of the complex-forming reaction occurs in the presence of saturated salt solution.

EXAMPLE 5

This Example illustrates the use of a surfactant to reduce the viscosity of the dispersion. The procedure and equipment used are the same as Example 1. The materials used are shown below:

| | |
|---|---|
| Dioctyl Phthalate | 100.0 parts |
| Methylene Dianiline | 45.4 |
| Sodium Chloride | 4.5 |
| Water | 1.0 |
| "Emcol" D 70-30C (Witco Chemical Corp., Organics Division), phosphated mono- and diglycerides. | 0.5 |

The melting range of the solids in the dispersion is 155°–160°C. after 20.5 hours on the roller mill. the dispersion is relatively low in viscosity and easily pourable. In the absence of the dispersing agent, the dispersion is highly viscous and approaches a paste-like consistency.

EXAMPLE 6

The reaction/dispersion is carried out using a high speed (~7000 rpm) dispersion device (Eppenbach homogenizer), Gifford and Wood, Inc. The materials listed below except methylene dianiline are charged into a one liter open beaker into which is placed a laboratory homogenizer (Eppenbach). Agitation and methylene dianiline addition are started at room temperature. After the methylene dianiline is added, the agitation is continued until the temperature has reached 75°C. (about 15 minutes). At this point, the agitation is stopped.

| | |
|---|---|
| Dioctyl Phthalate | 100.0 parts |
| Sodium Chloride | 4.8 |
| Methylene Dianiline | 45.0 |
| Water | 5.0 |

Microscopic examination indicated that the particle size is less than 5 microns as determined by microscopic examination. The melting range of the solids after isolation is 150°–153°C.

EXAMPLE 7

This Example illustrates the preparation of the complex in the absence of an inert carrier liquid. The materials are charged into a one-quart ball mill about half filled with ceramic balls (~¾inch). The ball mill is then placed on rollers for the time specified. The material proportions are shown below:

| | |
|---|---|
| Methylene Dianiline | 100.0 parts |
| NaCl | 9.43 |
| Water | 4.4 |

The melting range of the solids is 160°–165°C. after about 21 hours of milling. Microscopic examination indicated that over 90% of the particles had an average particle size of less than 5 microns.

What is claimed is:

1. In a process for forming a complex of 4,4'-methylene dianiline (MDA) and an alkali metal salt selected from the group consisting of sodium chloride, sodium bromide, sodium iodide, lithium chloride, lithium bromide, lithium iodide, and sodium cyanide, the mole ratio of MDA/salt in said complex being 3:1, the improvement comprising adding to the MDA/salt mixture 1) at least about 0.5 parts of water per 100 parts of salt but not enough to dissolve all the salt until the complex-forming reaction is at least 50% complete, and 2) 2–35 parts of an inert liquid carrier per part of salt; conducting the reaction between the MDA and salt with agitation, and recovering directly from said reaction a dispersion of MDA/salt complex particles of such fineness that at least 95% have a maximum diameter of about 10 microns.

2. In a process for forming a complex of 4,4'-methylene dianiline (MDA) and sodium chloride in a mole ratio of 3:1, the improvement comprising adding to a mixture of the MDA and sodium chloride 1) at least about 0.5 parts of water per 100 parts of sodium chloride but not enough to dissolve all the sodium chloride until the complex-forming reaction is at least 50% completed, and 2) 2–35 parts of an inert liquid carrier per part of sodium chloride; employing a sodium chloride/MDA ratio of about 1:10 in parts by weight, conducting the reaction between the MDA and sodium chloride with agitation, and recovering directly from said reaction a dispersion of MDA/sodium chloride complex particles of such fineness that at least 95% have a maximum diameter of about 10 microns.

3. The process of claim 1 wherein said process is carried out in the presence of an oil-soluble dispersing agent.

4. The process of claim 1 wherein said salt is sodium chloride.

5. The process of claim 1 wherein said reaction takes place at substantially ambient conditions.

6. The process of claim 1 wherein the reaction takes place at a temperature of less than about 80°C.

7. The process of claim 1 wherein the salt is lithium chloride.

8. The process of claim 3 wherein said dispersing agent is lecithin.

9. The process of claim 3 wherein said dispersing agent is a polyoxypropylated quaternary ammonium halide.

10. The process of claim 1 wherein said inert liquid is di(2-ethylhexyl)phthalate.

11. The process of claim 1 wherein said inert liquid is tetraethylene glycol bis(2-ethylhexanoate).

12. The process of claim 1 wherein said inert liquid is an aromatic process oil which comprises 18% polar compounds, 76% aromatics, and 6% saturated petroleum derivatives.

* * * * *